United States Patent
Habert (10) Patent No.: US 6,480,900 B1
(45) Date of Patent: Nov. 12, 2002

(54) COMMUNICATION METHOD IN A SET OF DISTRIBUTED SYSTEMS VIA AN INTERNET TYPE NETWORK

(75) Inventor: Michel Habert, Saint-Egrève (FR)

(73) Assignee: Bull, S.A., Louveciennes (FR)

( * ) Notice: Subject to any disclaimer, the term of this patent is extended or adjusted under 35 U.S.C. 154(b) by 0 days.

(21) Appl. No.: 09/380,573

(22) PCT Filed: Dec. 28, 1998

(86) PCT No.: PCT/FR98/02890

§ 371 (c)(1),
(2), (4) Date: Sep. 7, 1999

(87) PCT Pub. No.: WO99/35796

PCT Pub. Date: Jul. 15, 1999

(30) Foreign Application Priority Data

Jan. 6, 1998 (FR) .............................. 98 00055

(51) Int. Cl.⁷ .............................. G06F 15/16
(52) U.S. Cl. ............ 709/245; 709/226; 709/229
(58) Field of Search ................. 709/245, 226, 709/229; 370/389, 395.53

(56) References Cited

U.S. PATENT DOCUMENTS

| | | | | |
|---|---|---|---|---|
| 5,793,763 A | * | 8/1998 | Mayes et al. | 370/389 |
| 5,892,912 A | * | 4/1999 | Suzuki et al. | 370/395.53 |
| 5,918,016 A | * | 6/1999 | Brewer et al. | 709/226 |
| 5,938,732 A | * | 8/1999 | Lim et al. | 709/229 |
| 5,968,126 A | * | 10/1999 | Ekstrom et al. | 709/226 |
| 6,061,349 A | * | 5/2000 | Coile et al. | 370/389 |

OTHER PUBLICATIONS

B. Carpenter: "IPng White Paper on Transition and Other Considerations" Request For Comments, vol. RFC, No. 1671, Aug. 1994 pp. 1–6, XP002084640 http://www.p-mg.lcs.mit._edu/cgi–bin/rfc/view?1671.

F. Kastenholz: "Technical Criteria for Choosing IP The Next Generation (IPng)" Request For Comments, vol. RFC, No. 1726 Dec. 1994 XP002084641.

* cited by examiner

Primary Examiner—Zarni Maung
Assistant Examiner—Gregory Clinton
(74) Attorney, Agent, or Firm—Miles & Stockbridge P.C.; Edward J. Kondracki (57) ABSTRACT

The invention relates to a communication process via an internet network that comprises distributed systems ($S_1$). Each system ($S_1$) is connected to the network ($SR_x$) via a standard interface module (10), standard software layers (12, 13) comprising a stack of addresses and protocols, and hosts software entities ($SV_A$, $SV_B$). The latter and the systems ($S_1$) are provided with a network address in a virtual subnetwork to which the system itself ($S_1$) and said software entities ($SV_A$, $SV_B$) are connected via a specific interface module (11, 20, 30) and specific software layers (21–22, 31–32) comprising a stack of addresses and protocols. The addresses and names of the systems ($S_1$) and of the software entities ($SV_A$, $SV_B$) connected to the virtual networks ($SVN_y$) are stored in a domain name directory ($DNS_1$), making it possible to directly address one of the software entities ($SV_A$, $SV_B$).

18 Claims, 3 Drawing Sheets

FIG_1a PRIOR_ART

FIG_6

FIG_1b PRIOR_ART

FIG_1c PRIOR_ART

FIG_2

COMMUNICATION METHOD IN A SET OF DISTRIBUTED SYSTEMS VIA AN INTERNET TYPE NETWORK

BACKGROUND OF THE INVENTION

1. Field of the Invention

The present invention relates to a communication process in a set of distributed systems through an internet type network.

More particularly, the invention relates to the naming, the addressing, and the routing of information between the distributed systems, via one or more networks or subnetworks using internet technology.

Within the scope of the present invention, the term "internet" should be understood in its most general sense. It specifically includes, in addition to the global network of computers known as the "Internet" per se, private corporate networks or the like, known as "intranets," and the networks that extend them to the outside, known as "extranets."

It is also useful, for purposes of clarity, to review several definitions used in the description of the present invention.

Hereinafter, a unit, a data processing machine, or more generally, a platform, using an operating system ("OS") will be called a "system." These systems are connected to one another by one or more networks or subnetworks, at least some of which use internet technology, in the sense mentioned above. Hereinafter, the terms "networks" and "subnetworks" will be used interchangeably.

These systems host "servers." A server is generally defined as being software or a software entity that provides a given service (for example, file transfer software).

In internet technology, so-called "IP" addresses are used. An address of this type is structured and comprises a subnetwork address, called a prefix, and an address of an entity in this subnetwork.

Referring again to a server, it is addressable according to the prior art by means of an IP address as just defined and a port number, which will be designated $P_i$, with i being an arbitrary subscript. This port number typically comprises two bytes and makes it possible to reach the server i in the system.

In summary, if a system with the arbitrary subscript $0$ is referenced $S_0$, and is associated with an IP address notated "X, $X_0$", this means that this system $S_0$ is connected to the subnetwork with the prefix X, with $X_0$ as its address in this subnetwork. A system can naturally be connected to several subnetworks. In this case, it has as many IP addresses as there are subnetworks.

Although the invention applies to all sorts of existing applications or services, it applies more particularly to distributed systems using "object" technology and to communications of the "client-server" type. To explain the concept, without in any way limiting its scope, the following will keep to this preferred context of the invention, unless stated otherwise. In other words, this particular technique applies to the exchanges of messages between client objects and server objects, which objects can be distributed throughout the entire system.

2. Description of Related Art

As is well known, systems connected to one or more networks or subnetworks are grouped into domains.

In the past, the networks and the systems were dissociated, and each domain used its own mechanisms for naming and addressing entities as well as for routing information in the networks and systems.

Moreover, the mechanisms were not unified within the same network or system domain. A first simplification or streamlining occurred, with respect to networks, with the emergence of internet.

As for the systems themselves, the degree of streamlining is generally very low. However, there have been a few attempts at streamlining. For example, with respect to address directories, it is possible to use the access method known by the acronym "LDAP" ("Lightweight Directory Access Protocol") and the architecture that conforms to the "X500" standard. In addition, services such as "DNS" ("Domain Name Server") are beginning to be integrated into operating systems ("OS") or into "middleware." However, there is still a big difference between the "network" approach and the "system" approach.

In summary, it is clear that in the prior art, the systems, subsystems, services and software applications normally use specific solutions for the naming, addressing and routing of information. This situation is not without its drawbacks, and several of these will be discussed.

First of all, the multiplicity of solutions makes the process for configuring the components listed above very complex.

The configurations are normally static. However, as noted, there is a trend toward using directories of the "X500" type for the system objects: the users, the resources, the services and the applications. Nevertheless, the network objects, which are managed by the internet domain name servers ("DNS"), are still excluded and are not integrated with the system objects.

It follows that when a client interacts with a server, specific addressing and name resolution services are used. For example, naming services like those known by the name "CORBA" (defined by the "Object Management Group" consortium) may be cited. These services use very different mechanisms. Other services are known, for example the naming service of the "DCE" ("OSF" in a distributed environment), or of "TUXEDO" (distributed transaction service known in the "UNIX" environment, "TUXEDO" and "UNIX" being registered trademarks).

In general, clients that address a remote entity managed by a system, service or application invoke a name service. This requires the name of the network and the network address of the system that contains the entity to be reached.

The drawbacks inherent in these solutions are the following: a multiplicity of naming services, directories, and tables of correspondences between network and system addresses, the complexity of the configuration processes, and above all, the need for the client (or user) to know which system (i.e., which machine) contains the object addressed, or more generally, the entity addressed.

The processes according to the prior art therefore have numerous drawbacks. Furthermore, it may be added that they do not meet the current needs, or at least meet them inadequately. The most important needs are listed below.

First of all, as has been noted, the configuration is most often static. The current need is to move toward "zero administration," based on an automatic and dynamic configuration.

A second need relates to portability. An object, or more generally an entity, belonging to a "DNS" domain must be able to migrate, i.e., to leave its domain, while remaining addressable as though it had stayed in its domain.

A third need, which goes hand-in-hand with the second, is that the servers must be independent from the host platforms. This setup allows unlimited migration.

A fourth need relates to security, in the broadest sense of this concept: authentication, access control, integrity and confidentiality of the exchanges. Generally, this is called the "AIC" concept—for "Availability—Integrity—Confidentiality." These requirements must be met from end to end between, for example, the client object and the server object, i.e., a software entity, and not just during the passage through the network or networks, i.e., between physical machines.

A fifth need relates to the compatibility, or coexistence, between the various internet protocols, especially between the widely used "IPV4" version and the more recent "IPV6" version, this version being a subset of the "IPNG" (Internet Protocol New Generation") standard currently being implemented.

However, it must be noted that an address conforming to the IPV4 protocol has only four bytes, or $2^{32}$ theoretical addresses, actually far fewer because of the structural hierarchy (particularly the presence of a prefix). Projections into the future have shown that, given the predictable growth of the Internet, a real shortage of addresses should occur during the period from 2005 to 2011. Also, since 1995, recommendations for the adoption of a new protocol, IPV6, have been published ("Internet Engineering Task Force" and "IPng" work groups). An address conforming to this IPV6 protocol comprises sixteen bytes, which allows for a much larger address space, even if not all of the addresses are actually usable, as in the case of the IPV4 protocol. In effect, this has been calculated to represent $6.65 \times 10^{23}$ network addresses per square meter of the surface of the planet. A more detailed description of this protocol may be found in the in the book by A. Thomas, "IPng and the TCP/IP protocols," published by Wiley Computer Publishing, 1996.

SUMMARY OF THE INVENTION

The process according to the invention further multiplies the need for numbers of distinct addresses, as will be shown. For all of these reasons, it is preferable to use the IPV6 protocol within the scope of the invention.

Consequently, the object of the invention is to eliminate the drawbacks of the prior art, while meeting the current needs, some of which have been mentioned, without significantly increasing costs, while possibly even obtaining a reduction of these costs.

To this end, the systems, accepting what has been given, are considered to be virtual networks, which hereinafter will be called "system virtual networks" or "SVN". In other words, the software entities, for example software objects in a preferred embodiment, become directly addressable in a system. This system constitutes a node of the virtual network "SVN" and also a node of the "real" network, i.e., the Internet, intranet or extranet. The system acts as a gateway that interconnects the nodes of the virtual network "SVN" to the aforementioned "real" network.

In a preferred variant of the invention, the process also provides a dynamic, i.e., automatic, configuration capability. To do this, it uses the above-mentioned IPV6 protocol. The latter characteristic also offers the capability to meet certain additional requirements, such as portability and/or security.

The physical and logical objects, or more generally the physical and logical entities, whether they are of the system or the network type, i.e., the clients, servers, systems, gateways, routers, etc., are at the same address level. Common mechanisms are used for the naming, the addressing, and the name resolution and routing services. When a client establishes a connection with a software server that, in a preferred variant of embodiment, is an object container, there is no longer a need to also provide the name of the system (i.e., the machine and its services) that contains this server.

Hence, the subject of the invention is a process for communication in a set of distributed systems via at least one internet type network, said set being divided into at least one domain comprising systems addressable via said network by means of a first series of internet type addresses stored in a domain name directory and each system being connected to said network via a standard interface module, standard software layers comprising a stack of addresses of the first series and internet type communication protocols, and hosting at least one software entity, characterized in that said software entities and said systems are each associated with an internet type address of a second series, in that each system is configured into a so-called system virtual network, to which the system itself and said software entities are connected via specific interface modules and specific software layers comprising a stack of addresses of the second series and internet type communication protocols, and in that said addresses and names of the systems and the software entities connected to said system virtual networks are stored in said domain directory, making it possible to directly address any of said software entities hosted in any of said systems.

Hence, it is clear that the process according to the invention provides many advantages, including the capability for a client (or more generally for a user) to directly address a server (or more generally a software entity), and not the system that contains it.

BRIEF DESCRIPTION OF THE DRAWINGS

The invention will be more clearly understood and other characteristics and advantages will emerge from the reading of the following description in reference to the attached figures, in which.

DESCRIPTION OF THE PREFERRED EMBODIMENTS

Figure 1A:
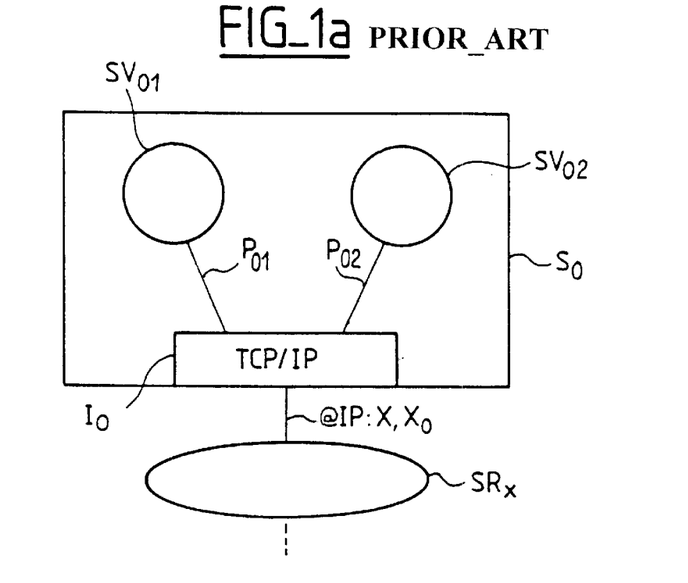
FIGS. 1a through 1c illustrate an architecture of a distributed system in an internet type network according to the prior art.
Figure 1B:
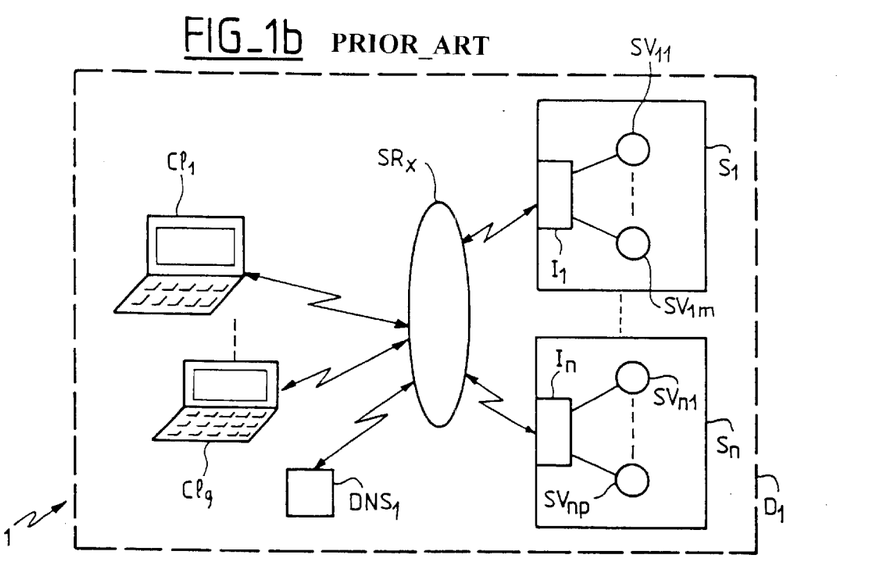
Figure 1C:
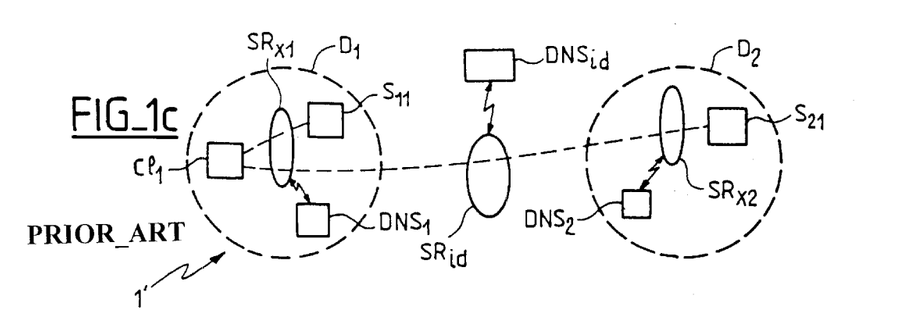

Before describing the process according to the invention, it is first necessary to review the configuration of a system 1 according to the prior art and its chief characteristics, in reference to FIGS. 1a through 1c.

First of all, let us consider an isolated system, referenced $S_0$, connected to an internet type subnetwork $SR_X$, with the prefix X, as illustrated more particularly by FIG. 1a. Let us also assume that it hosts two servers $SV_{01}$ and $SV_{02}$, i.e. two software objects, or more generally two software entities. The system $S_0$ has an IP address in the subnetwork $SR_X$ given by the relation @IP:X, $X_0$.

Each server, $SV_{01}$ or $SV_{02}$, is identified by an IP address and a port number, $P_{01}$ or $P_{02}$, which are:

for the server $SV_{01}$: X, $X_0$, $P_{01}$;

for the server $SV_{02}$: X, $X_0$, $P_{02}$.

The system $S_0$ is connected to the subnetwork $SR_X$ via an interface $I_0$, which will be described in detail below, and which comprises various logical layers: stacks of IP addresses, communication protocols. Only this interface knows the port numbers $P_{01}$ and $P_{02}$. Therefore, it is easy to see that according to the prior art, when wishing to address one of the servers $SV_{01}$, of $SV_{02}$ from outside the system $S_0$, it is absolutely necessary to know the IP address of this system, i.e., the address @IP:X $X_0$.

FIG. 1b illustrates, more generally, a set 1 of systems connected via a subnetwork $SR_X$, again in a configuration according to the prior art.

In FIG. 1b, it is assumed that the set 1 constitutes one and only one domain $D_1$. It is also assumed that the system 1 comprises q clients, referenced $Cl_1$ through $Clq$, and n machines, i.e., systems, referenced $S_1$ through Sn. Each system comprises a given number of servers, for example m servers in the system $S_1$ referenced $SV_{11}$, through $SV_{1m}$, and p servers in the system $S_n$, referenced $SV_{n1}$ through $SV_{np}$. Each system is provided with one or more so-called IP addresses.

The exchanges of information, i.e., of messages, take place using the "TCP-IP IP" protocol between the clients $Cl_1$ through $CL_q$, and the systems $S_1$ through $S_n$, via the internet type subnetwork $SR_X$. The domain $D_1$ also comprises a domain name server $DNS_1$ that stores a directory of IP addresses. Finally, each system $S_1$ through $S_n$ comprises an interface, $I_1$ through $I_n$, with the subnetwork $SR_X$, which stores a stack of IP addresses associated with each system and a routing table that makes it possible to transfer a received message to another system via the subnetwork $SR_X$.

Within a system, for example the system $S_1$, a particular server, for example the server $SV_{11}$, is identified by a port number, as noted in connection with FIG. 1a.

When a client, for example $Cl_1$, wants to address a particular server, for example the aforementioned server $SV_{11}$, it is necessary for it to know the name of the system that is hosting it, in this case the system $S_1$. The directory present in the server $DNS_1$ establishes a correlation between the name and the IP address of the system $S_1$ containing the server $SV_{11}$. The client $Cl_1$ then addresses the system $S_1$ using the IP address it receives from the domain name server $DNS_1$.

As shown in FIG. 1c, the addressing schema is very similar to the one just described when the set of systems, referenced 1', comprises several domains, for example two domains $D_1$ and $D_2$. Each domain $D_1$ and $D_2$ comprises its own specific domain address server $DNS_1$ and $DNS_2$, and a network or subnetwork $SR_{X1}$ and $SR_{X2}$, respectively. The interconnections between subnetworks take place via an interdomain network or subnetwork $SR_{id}$, and a server, also interdomain, $DNS_{id}$, is provided. If the client $Cl_1$ in the domain $D_1$ no longer wishes to address a server (not represented) comprised in the system $S_{11}$ of the domain $D_1$, but a server (not represented) comprised in the system $S_{21}$ of the domain $D_2$, it will be provided with the address of the destination domain $D_2$ by the server $DNS_{id}$; then, in the domain $D_2$, it will be provided with the address of the destination system $S_{21}$ by the server $DNS_2$. Here again, it is necessary to know the name of the system hosting the server addressed, in this case the name of the system $S_{21}$.

Before describing the process of the invention, it is also necessary to briefly review the mechanisms used in the domain servers, for example $DNS_1$ or $DNS_2$, and those used for routing.

The main function of domain name server, or "DNS," is to establish a correspondence between symbolic names assigned to systems (and more generally to entities, as explained above, within the scope of the process according to the invention), and IP addresses. A domain name server operates hierarchically. It is constituted by domains, for example $D_1$ or $D_2$ (FIG. 1c), that allow the names to be divided into functional categories, for example associated with a business, with a country, etc. This last characteristic, at the "top" of the aforementioned hierarchy (first level domains), is represented by a suffix such as "com," "edu," "gov," "int," "mil," "net," "org," "fr," etc., separated from the rest of the name by a period. The rest of the domain name can in turn be divided into partial domain names separated by periods (lower levels). For example, a given business service could be represented by a symbolic name such as "service1.xxx.com", in which "xxx" would represent the name of a company and "service1" would represent a particular service. A search for this name makes it possible to focus on the domain name servers "DNS" assigned to ".com". If a name of the aforementioned type is being searched for, it is the domain name server "DNS" assigned to ".xxx", whose superior server is ".corn", that will process the request. This corresponds to the schema implicitly described in connection with FIG. 1c.

More precisely, for example, in the domain name server $DNS_1$ of the domain $D_1$ that contains the system $S_{11}$, there is an entry of the type "sys11→$X_1, X_{11}$", $X_1$ being the prefix of the subnetwork $SR_{X1}$, and $X_{11}$ the address of the system $S_{11}$ in the subnetwork $SR_{X1}$.

Within a system, an initial configuration operation makes it possible to allocate it an address using a specific command. For example, in a "UNIX" (registered trademark) environment, the command "IFCONFIG" makes it possible to configure the network interfaces, for example $I_1$ through $I_n$ (FIG. 1b), of a stack of internet protocols. This configuration operation creates an entry in a table known by the acronym "IFNET". This table contains a description of the interface, the IP address, status information and pointers to the "drivers" associated with the interface. After this operation, the system $S_{11}$ (in the example) has the address $X, X_{11}$ as its IP address.

Referring again to FIG. 1a, the routing allows access to a subnetwork other than the subnetwork $SR_X$, for example a network $SR_Z$ (not represented), Z being the prefix of this network. this access takes place through the system $S_0$, which constitutes an X-Z gateway. The system $S_{11}$ is a terminal and the IP routing level can be deactivated.

Within an internet network, the routers use databases that make it possible to switch the packets of informational data. There are many known routing protocols such as "RIP" ("Routing Information Protocol") or "OSFP" ("Open Shortest Path First"). These protocols allow the routers to exchange routing information. For example, if the "RIP" protocol is used, a given system communicates the addresses of its prefixes (i.e., the addresses of the subnetworks to which it is connected) to all of its neighbors. Thus, step by step, the routes that allow the packets to be routed are established.

It is then necessary to declare "drivers," and more precisely, two types of drivers: a network interface driver, called "nid", and a driver that corresponds to the electronic circuit board for interfacing with the network, called "ndd" (for "network device driver").

The process according to the invention will now be described.

Figure 2:
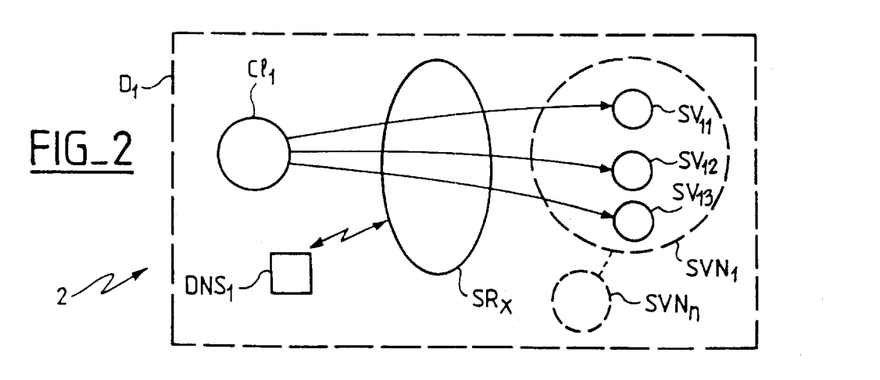
FIG. 2 schematically illustrates the process according to the invention.

FIG. 2 very schematically illustrates the process for addressing servers according to the invention. It is assumed in FIG. 2, for purposes of streamlining that the set of systems, here referenced 2, is comprised within only one domain $D_1$, associated with one domain name server $DNS_1$ and only one client $Cl_1$.

According to a first important characteristic of the invention, each "real" system ($S_1$ through $S_n$ of FIG. 1b) is comparable to a virtual network $SVN_1$ through $SVN_n$, represented by dotted lines in FIG. 2. These networks will hereinafter be called "system virtual networks."

According to a second important characteristic of the invention, the servers for example $SV_{11}$ through $SV_{13}$, are each associated with an individual IP address. It follows that each server, for example the server $SV_{11}$, i.e., an object or a software entity, is directly addressable by a client, for example a client $Cl_1$, and more generally a client $Cl_X$ if the system 2 comprises several clients (x being arbitrary). In other words, a client no longer needs to know the name of the system hosting the server sought. The directory of the server $DNS_1$ stores all of the IP addresses of the servers, for example the servers $SV_{11}$ through $SV_{13}$ of the system virtual network $SVN_1$.

It must be noted that, in a multidomain system, all the servers of a system virtual network belong to the same domain.

According to a third important characteristic of the invention, the "real" systems or machines ($S_1$ through $S_n$ of FIG. 1b) which, in a configuration according to the prior art, constitute endpoint systems, become intermediate systems. They constitute nodes of the virtual networks $SVN_1$ through $SVN_n$, and also nodes of the "real" network, i.e. the internet or intranet subnetwork $SR_X$. The systems act as gateways that interconnect the nodes of the virtual networks $SVN_1$ through $SVN_n$ with the subnetwork $SR_X$. Each system is also provided with an IP address.

Figure 3:
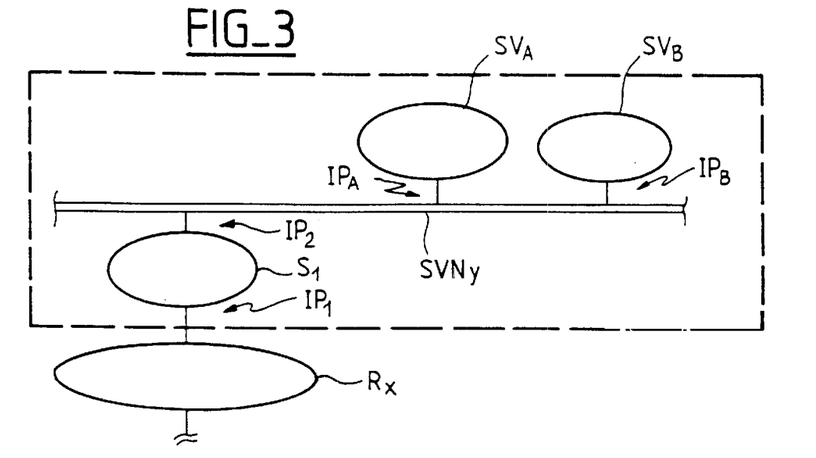
FIGS. 3 and 4 illustrate the architecture of a system according to the process of the invention.

Hence, a system virtual network $SVN_1$ associated with a system $S_1$ may be represented as illustrated by FIG. 3. It is noted that the system $S_1$ actually constitutes a node for the network $R_X$ and that, seen from this network (i.e., from the outside), it is associated with a first address $IP_1$, with @$IP_1$:X, $X_1$, X being the prefix assigned to the subnetwork $SR_X$ and $X_1$ the address of $S_1$ in the subnetwork $SR_X$.

It is assumed that the system virtual network $SVN_Y$ is constituted by the two servers referenced $SV_A$ and $SV_B$ that it hosts and by the system $S_1$ itself. Seen from the system virtual network $SVN_1$, the system $S_1$ is associated with a second address $IP_2$, with @$IP_2$:Y, $Y_1$, Y being the prefix assigned to the system virtual network $SVN_Y$ and $Y_1$ the address of $S_1$ in the network $SVN_Y$.

Likewise, the servers $S_A$ and $S_B$ are associated with two addresses $IP_A$ and $IP_B$, respectively, with @$IP_A$:Y, $Y_A$, and @$IP_2$:Y, $Y_B$, $Y_A$ and $Y_B$ being the addresses of $SV_A$ and $SV_B$, respectively, in the network $SVN_Y$.

Figure 4:
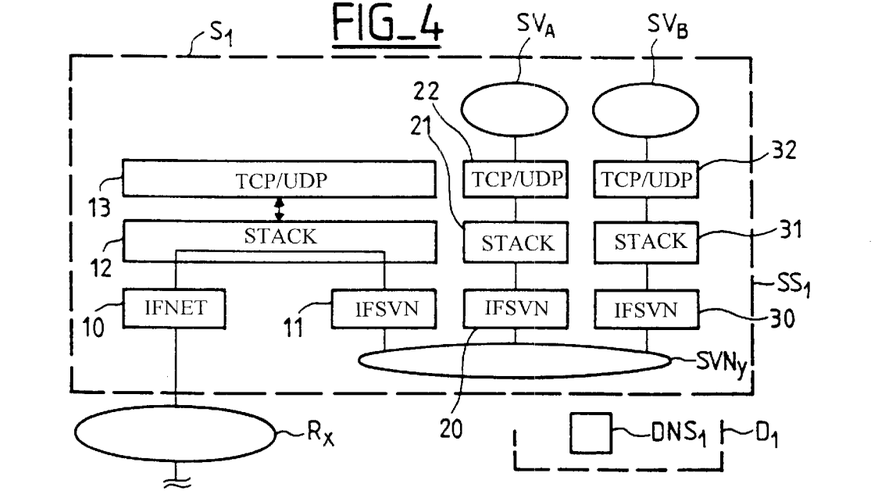

FIG. 4 illustrates in greater detail the architecture of the system $S_1$ according to the invention.

The "real" network $R_X$ communicates with the system virtual network $SVN_Y$ via a standard network interface module 10, known by the acronym "IFNET" (common to the prior art), a stack of system IP addresses 12, also standard, and an interface module 11 specific to the system virtual network, which, for the sake of analogy, will be called "IFSVN". In essence, the latter plays a role similar to the "IFNET" interface 10. The system also comprises a standard "TCP/UDP" protocol layer 13.

Likewise, even though the servers $SV_A$ and $SV_B$ are physically located in the system $S_1$, they are both provided with specific "IFSVN" interface modules, 20 and respectively, 30, stacks of IP addresses, 21 and 31 respectively, and "TCP/UDP" protocol layers, 22 and 32 respectively. The servers $SV_A$ and $SV_B$ therefore communicate with the system virtual network $SVN_Y$ through these two layers and through the specific interface modules.

In other words, the specific interface modules 11, 20 and 30 allow for a standard behavior of the IP level (level 12) of the system $S_1$ that contains the system virtual network $SVN_Y$. They allow the routing of packets of information within the system $S_1$ to the software servers $SV_A$ and $SV_B$, which henceforth act like virtual endpoint systems of the system virtual network $SVN_Y$.

According to the invention, the allocation of IP addresses, whether they relate to the systems per se or more specifically to the software servers, takes place in a way that is intrinsically similar to the methods of the prior art.

For a given server, for example $SV_A$, i.e., related to an object run in a system, for example the system $S_1$ included in the domain $D_1$, the directory of the server $DNS_1$ is updated. This update can be performed manually or automatically, as will be explained below.

More precisely, an object or an entity uses two functions that are intrinsically known: the allocation of a global address and the release of an address.

As indicated, the allocation of an address takes place in a way similar to the prior art, but with one major difference: the system virtual networks are referenced in the domain name server with the entities that are connected to them, including the software servers.

Returning to the example of FIG. 4, the domain name server $DNS_1$ stores the following entries:

a/ sys1→X,$X_1$;

b/ sys2→Y,$Y_1$;

c/ serva→Y,$Y_A$;

d/ servb→Y,$Y_B$; the entries a/ and b/ being related to the addresses $IP_1$ and $IP_2$, respectively, and the entries c/ and d/ being related to the addresses $IP_A$ and $IP_B$, respectively. It must be noted that sys1, sys2, serva, and servb are symbolic names.

A server or service is therefore directly addressable. For example, if a company "xxx" has the domain name server $DNS_1$ and its superior domain name server is the server of "com", the service "serva" becomes addressable in the Internet by the name "serva.xxx.com". Any client object, or more generally any user, can query its domain name server to request the IP address corresponding to this name. The domain of the system that sent the request, given the structuring of the name (i.e., a notation that includes periods) transfers the request to its superior domain name server if it cannot handle it itself, and so on until a particular domain server is capable of addressing the request to the domain name server that will handle the correspondence "symbolic name-IP address requested," for example the server $DNS_1$.

The address releasing function releases an address previously allocated to an object.

For routing purposes, the system $S_1$ is no longer an endpoint, but has become a gateway. The IP routing level is necessarily activated.

In order for there to be correct routing between all of the systems of a network, no matter what its nature, it is also necessary to perform name resolution operations. This function is the most important of those assigned to the protocol "ICMP" (for "Internet Control Message Protocol"). It consists in the discovery, for a given system, for example $S_1$, of the neighbor systems that share the links to which it is connected. This operation takes place the first time a datagram is sent through the network $SR_X$ to a neighbor. In effect, at this instant, the system $S_1$ that wishes to send a datagram to one of its neighbors knows the IP address of the destination, but not its network address (for example an "Ethernet" (registered trademark) address, if it is a network of that type). In practical terms, this means that the system $S_1$ must construct a table that establishes the correspondences between IP addresses and network addresses. To do this in local area networks, for example in networks of the aforementioned "Ethernet" type, the IPV4 protocol uses a protocol known by the term "ARP" (for "Address Resolution Protocol") and the IPV6 protocol uses a protocol known by the term "NDP" (for "Neighbor Discovery Protocol"). For example, if the protocol "NDP" is used, the system $S_1$ can know the network addresses of the other systems that share its links. A given system uses a broadcast address to request from its neighbors, as a function of their IP addresses, their network addresses.

In the case of the system virtual networks according to the invention, for example $SVN_Y$, the various users are the system $S_1$ itself and the servers hosted by this system $SV_A$ and $SV_B$. Since they are located in the same place, the neighbor discovery described above is unnecessary. The protocols "ARP" or "NDP" are not invoked.

The initial configuration operation must, in the case of the invention, be subdivided. For example, in the above-mentioned "UNIX" environment, the command "IFCONFIG" is also used. However, it is necessary to configure the interface to the subnetwork $SR_X$, the interface to the system virtual network $SVN_Y$, and also to configure an address of the alias type for each server connected to this network. In the example described, two addresses must be configured: @IPA:Y, $Y_A$ and @PB:Y, $Y_B$.

As in the case of the prior art, it is necessary to declare "drivers," and more precisely, two types of drivers: a network interface driver, called "nid," and a driver that corresponds to the electronic circuit board for interfacing with the network, called "ndd" (for "network device driver"). Likewise, it is necessary to declare an interface driver for the system virtual network, for example $SVN_Y$. This last driver is created (software development) in accordance with the rules for writing a standard interface driver "nid". It must be noted that the equivalent of the driver "ndd" is no longer necessary. In fact, the "TCP/IP" layers necessarily comprise a driver called a "loopback" which, for the system virtual network $SVN_Y$, plays the role of the driver "ndd" for the subnetwork $SR_X$.

The way in which data packets enter and leave the system $S_1$ will now be described in greater detail.

If a data packet containing the indications "Y, $Y_A$" in its IP address arrives in the system $S_1$, the latter consults the local address table. It finds "Y, $Y_A$ in the "IFNET" table 10 (an entry called an "alias") and considers the packet to have arrived at its destination and delivers it to the waiting application, i.e., the server $SV_A$, via the virtual network $SVN_Y$.

If a data packet is sent by a server, for example the server $SV_B$, to a server $SV_n$ located outside the system virtual network $SVN_Y$, the system $S_1$ acts as a "routing server," or gateway, and switches this packet to the network interface that corresponds to the subnetwork $SR_X$.

If, on the other hand, a data packet is sent by a server, for example the server $SV_B$, to a server located inside the system virtual network $SVN_Y$, for example the server $SV_A$, the system $S_1$ also acts as a router. It detects that the destination address corresponds to one of the local addresses. It executes a standard loop of the type known by the term "loopback" (mandatory in any stack of TCP/IP protocols, as indicated above) and transmits the packet to the server $SV_A$. Hence, the data packet does not leave the system $S_1$. In particular, it does not pass through the subnetwork $SR_X$.

The process according to the invention offers many advantages and possibilities.

First of all, it must be noted that the process according to the invention is fully compatible with the internet protocol most commonly used to date, i.e., the IPV4 protocol, alone or in combination with the new IPV6 protocol.

Figure 5:
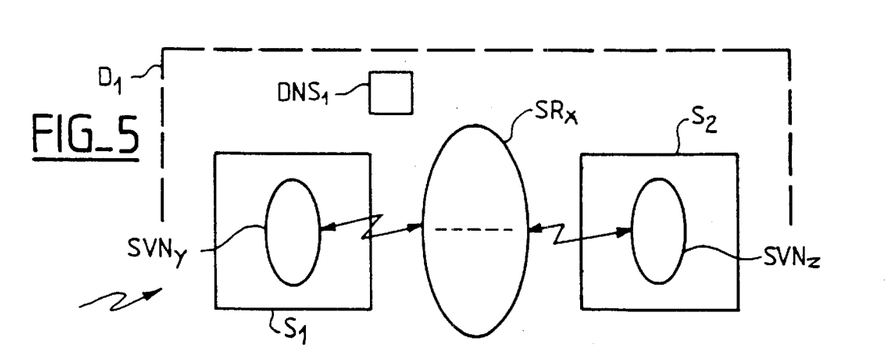
FIG. 5 schematically illustrates a communication process in a two-protocol system.

FIG. 5 illustrates, by way of example, the communication process between two system virtual networks $SVN_Y$ and $SVN_Z$, comprised in two systems, $S_1$ and $S_2$ respectively. It is assumed that the two systems have both IPV4 and IPV6 addresses. It is also assumed that the network $SR_X$ that connects the two systems $S_1$ and $S_2$ uses the IPV4 protocol. The standard encapsulation mechanisms used by the IPV6 protocol allow the users of the systems $S_1$ and $S_2$ to interoperate by using IPV6 packets that are encapsulated into IPV4 packets as they pass through IPV4 networks, as is the case for the network $R_X$.

The two protocols can therefore coexist, and the IPV4 protocol can still theoretically be used alone within the scope of the invention. However, it has been indicated that a shortage of addresses is predictable. Moreover, given that according to one of the most important characteristics of the invention, the servers are also provided with an IP address, which contributes to increasing the need for addresses, it seems preferable to use the IPV6 protocol within the scope of the invention.

Secondly, in combination with the new IPV6 internet protocol, the process according to the invention allows for a dynamic configuration, the dynamic resolution of the names being achieved by the protocol known as "NDP" (for "Neighbor Discovery Protocol"). The dynamic allocation of IP addresses is followed by an update of the databases of the directory service, making the owner of the IP address capable of communicating with a network of the internet, intranet or extranet type.

By way of example, a three-phase process, which makes an object or an entity dynamically addressable anywhere in a given domain, will be described in detail below.

During phase 1, the object is run in a first system, for example the system $S_1$ (FIG. 5), and the following steps are performed:

allocation of an IP address to the object;

the directory of the domain, for example $DNS_1$ of $D_1$, that contains the system $S_1$ is updated;

the object can then establish connections with other objects.

During phase 2, the object is transferred into another system, for example the system $S_2$ (FIG. 5), and the following steps are performed:

the object closes its active connections;

the object releases its IP address;

the directory $DNS_1$ of $D_1$ is updated;

the object is transferred to the system $S_2$ using a file transfer protocol.

During phase 3, the object is run in the system $S_2$ and the following steps are performed:

allocation of a new IP address to the object;

update of the directory $DNS_1$ of $D_1$;

the object can again establish or accept connections.

Third, the process according to the invention, again in combination with the IPV6 protocol, also allows for the portability of an object or an entity. In fact, the IPV6 protocol offers the capability for this object to leave a domain, while remaining addressable as though it were still in the original domain.

Fourth, the process according to the invention allows software objects or entities to fully benefit from the security techniques defined at the internet level. These techniques are implemented using "firewalls" and the "IPSEC" protocol. They provide access control services (address filtering), authentication, integrity (signatures) and confidentiality (using encryption algorithms). In the prior art, the internet link does not connect the systems to one another. In other words, the link and the "IPSEC" protocol do not extend as far as the software applications, i.e., as far as the servers. It is therefore common to provide additional secure software layers, well known by the acronym "SSL" (or "Secure Socket Layers") in the systems, which makes the links more complex, especially when each object or entity generally has its own specific security requirements.

The process according to the invention, through the concept of a new generation of "firewall" associated with each client and each server whose security must be ensured, simplifies the security of the systems, since the links extend all the way to the software objects or entities. In fact, according to one of its chief characteristics, these software objects have their own IP addresses and are therefore directly addressable. In addition to providing greater simplicity, the process also makes it possible to reduce the cost of the solutions. The equivalent security techniques implemented in the middleware in the prior art, illustrated for example by the above-mentioned "SSL" layer, become unnecessary.

Up to this point, each system has been considered to be autonomous. Advantageously, the process according to the invention can also be applied to systems in "clusters." In essence, the main purpose of such an architecture is to appear, seen from the outside, to be a single system or machine. The process according to the invention makes it possible achieve this objective.

Figure 6:
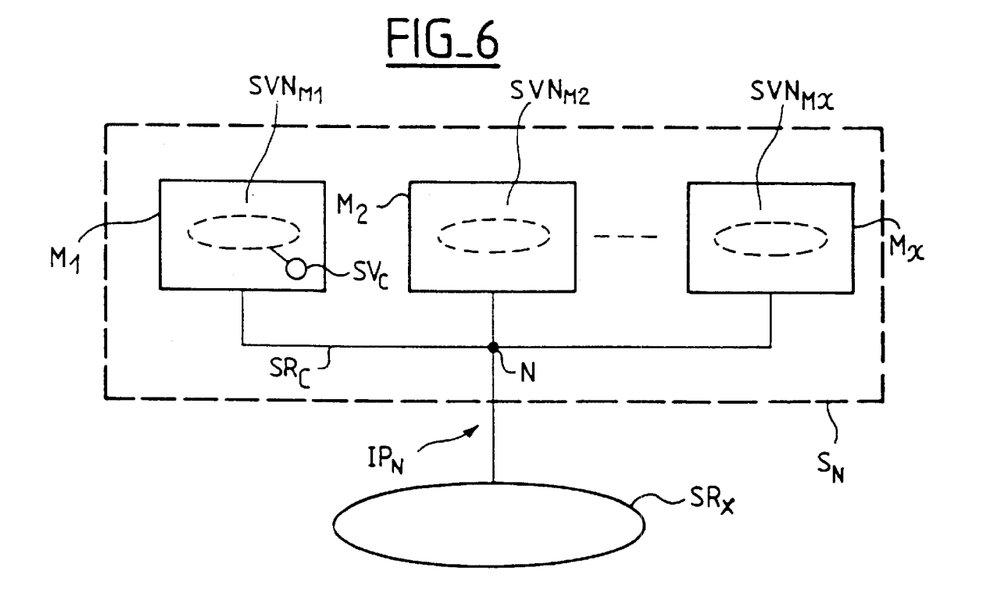
FIG. 6 illustrates the adaptation of the process according to the invention to a clustered system architecture.

FIG. 6 illustrates an architecture of this type. The clustered machines $M_1$ through $M_x$, x being the maximum number of machines, are interconnected through a local area network $SR_C$. There is network equipment in this local area network: the node N provided with an IP address, $IP_N$ in the network $SR_X$. Each machine, together with the servers it is hosting at a given instant, constitutes a virtual network $SVN_{M1}$ through $SVN_{Mx}$, these networks being connected according to the process of the invention to the network $SR_X$, to the local area network $SR_C$ by each system, and to the network $SR_X$ via the node N.

The standard IP mechanism organizes the routing of a packet addressing an object of a system virtual network to the node of the cluster that contains it, for example the server $SV_C$ in the system virtual network $SVN_{M1}$ in the machine $M_1$. For a remote client outside the cluster, the object addressed can be run in any node of the cluster, in a way that is transparent for this client. In effect, there is no longer any need to address a particular machine among the x machines. It is only necessary to address the desired object or entity, for example $SV_C$.

This mode of operation allows high availability. If an object or a software entity of a system virtual network becomes unavailable due to a hardware or software failure of the system that is hosting it, the object can be restarted in another node and the standard address resolution mechanisms will allow it to be reconfigured dynamically. To do this, it is simply necessary to implement the process according to the invention, in combination with the IPV6 protocol.

In another operating mode, the object or entity can be duplicated in two or more of the machines constituting the cluster. This redundancy can be provided for the same reasons as above (failure or malfunction) or in order to ensure availability, through rerouting, despite an overload of one or more machines (parallel operation).

With the reading of the above, it is easy to see that the invention clearly achieves the objects set forth.

The advantages offered by the invention are numerous. Without redescribing them in detail, it is possible to summarize them as follows:

streamlining of the addressing, the name services and the associated protocols, for the network objects or entities as well as for the objects or entities of the systems (software or applications);

independence of the servers from the systems (machines);

dynamic configuration, which makes it possible to move toward "zero administration";

portability of the software objects or entities;

network security services applied to the software objects or entities;

reduction of the costs of the solutions by reusing network services existing through middleware and applications;

and compatibility with current internet type architectures, as well as the utilization of standards.

It should be clear, however, that the invention is not limited to just the exemplary embodiments explicitly described, specifically in relation to FIGS. 2 through 5.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

What is claimed is:

1. A process for communication in a set of distributed systems via at least one internet type network, said set being divided into at least one domain comprising systems addressable via said network by means of a first series of internet type addresses stored in a domain name directory and each system being connected to said network via a standard interface module and having standard software layers comprising a stack of addresses of the first series and internet type communication protocols, and each system hosting at least one software entity, the process comprising:

providing said software entities and said systems with an internet type address of a second series;

configuring each system into at least one system virtual network to which the system itself and said software entities are connected via specific interface modules and specific software layers comprising a stack of addresses of the second series and internet type communication protocols; and storing said addresses and names of the systems and the software entities connected to said system virtual networks in said domain directory, such that any of said software entities hosted in any of said systems may be directly addressed from anywhere in said set of distributed systems using the internet type address of the second series or the names of the software entities.

2. A process according to claim 1, characterized in that the process comprises allocating an address comprising a prefix and an identifier to each of said software entities for updating said domain name directory to record the names and addresses of these software entities, and releasing addresses so as to release an address previously allocated to a given software entity.

3. A process according to claim 2, characterized in that said addresses are established in conformity with an internet protocol.

4. A process according to claim 3, characterized in that said address allocation is dynamic and in that the dynamic address allocation comprises at least the following phases and steps:

- a phase for running said software entity in a first system, comprising steps for allocating an address in conformity with the internet protocol, updating said domain name directory and establishing and/or accepting connections via said internet type network;
- a phase for transferring said software entity from said first system into a second system, comprising steps for closing active connections, releasing the internet type address of the software entity, and updating said domain name directory; and
- a phase for running said software entity in said second system, comprising steps for allocating a new address in conformity with the IPV6 internet protocol, updating said domain name directory, and establishing and/or accepting new connections via said internet type network.

5. A process according to claim 4, characterized in that communications between said software entities take place in a client-server mode.

6. A process according to claim 5, characterized in that said software entities are client objects or server objects.

7. A process according to claim 4, characterized in that, at least one of said systems is constituted by a cluster of at least two machines, connected to said network at a common node and each machine forming one of said system virtual networks, said node is associated with an internet type address of said first series, making it possible to address a software entity hosted by any one of said machines by means of an internet type address of said second series.

8. A process according to claim 7, characterized in that at least one of said software entities is duplicated in at least two of the machines of said cluster.

9. A process according to claim 7, characterized in that said software entities are connected by means of an internet link via said internet type network, in order to protect this link from end to end and firewalls are associated with said software entities.

10. A communication system in a set of distributed systems via at least one internet type network, said set being divided into at least one domain comprising systems addressable via said network by a first series of internet type addresses stored in a domain name directory and each system being connected to said network via an interface module and having software layers comprising a stack of addresses of the first series and internet type communication protocols, and each system hosting at least one software entity, the communication system being characterized in that said software entities and said systems are each provided with an internet type address of a second series, each system being configured into at least one system virtual network to which the system itself and said software entities are connected via specific interface modules and specific software layers comprising a stack of addresses of the second series and internet type communication protocols, and means for storing said addresses and names of the systems and the software entities connected to said system virtual networks in said domain name directory, such that any of said software entities hosted in any of said systems may be directly addressed from anywhere in said set of distributed systems using the internet type address of the second series or the names of the software entities.

11. A communication system according to claim 10, comprising means for allocating an address comprising a prefix and an identifier to each of said software entities for updating said domain name directory to record the names and addresses of these software entities, and releasing addresses so as to release an address previously allocated to a given software entity.

12. A communication system according to claim 11, characterized in that said addresses are established in conformity with an internet protocol.

13. A communication system according to claim 12, characterized in that said address allocation is dynamic and in that the dynamic address allocation comprises at least the following phases and steps:

- a phase for running said software entity in a first system, comprising steps for allocating an address in conformity with the internet protocol, updating said domain name directory, and establishing and/or accepting connections via said internet type network;
- a phase for transferring said software entity from said first system into a second system, comprising steps for closing active connections, releasing the internet type address of the software entity, and updating said domain name directory; and
- a phase for running said software entity in said second system, comprising steps for allocating a new address in conformity with the IPV6 internet protocol, updating said domain name directory, and establishing and/or accepting new connections via said internet type network.

14. A communication system according to claim 13, characterized in that said communications between said software entities take place in a client-server mode.

15. A communication system according to claim 13, characterized in that said software entities are client objects or server objects.

16. A communication system according to claim 13, characterized in that at least one of said systems is constituted by a cluster of at least two machines, connected to said network at a common node and each machine forming one of said system virtual networks, said node being associated with an internet type address of said first series, such that a software entity hosted by any one of said machines by means of an internet type address of said second series may be addressed.

17. A communication system according to claim 16, characterized in that at least one of said software entities is duplicated in at least two of the machines of said cluster.

18. A communication system according to claim 16, further including firewalls associated with a pair of said software entities and means connected by an internet link via said internet type network, in order to protect said link from end to end.

* * * * *